United States Patent [19]
Nystrom

[11] Patent Number: 5,930,092
[45] Date of Patent: Jul. 27, 1999

[54] POWER MONITORING

[75] Inventor: Robert W. Nystrom, Oxford, Mass.

[73] Assignee: Load Controls, Incorporated, Sturbridge, Mass.

[21] Appl. No.: 07/822,063

[22] Filed: Jan. 17, 1992

[51] Int. Cl.⁶ ................................................ H02H 5/04
[52] U.S. Cl. ................................................ 361/30; 361/83
[58] Field of Search ...................... 417/44 J; 361/23, 361/28, 30, 83, 93, 94; 310/DIG. 3

[56] References Cited

U.S. PATENT DOCUMENTS

| | | | |
|---|---|---|---|
| 3,054,952 | 9/1962 | Lehrmann | 324/107 |
| 4,034,233 | 7/1977 | Leyde | 307/41 |
| 4,084,075 | 4/1978 | Deffenbaugh | 219/97 |
| 4,419,625 | 12/1983 | Béjot et al. | 324/142 |
| 4,473,338 | 9/1984 | Garmong | 417/12 |
| 4,767,280 | 8/1988 | Markuson et al. | 417/44 |

*Primary Examiner*—Ronald W. Leja
*Attorney, Agent, or Firm*—Fish & Richardson P.C.

[57] ABSTRACT

The electrical power to a device, such as a pump, is monitored by multiplying a current signal with a voltage signal to provide a power signal. Typically when the power signal is outside a predetermined range, power to the device is interrupted.

16 Claims, 9 Drawing Sheets

BEFORE WINDING IMPEDANCE

AFTER WINDING IMPEDANCE

DIRECT CONNECTION TO POWER TRANSFORMER

AFTER WINDING IMPEDANCE

WITH RESISTORS R1 & R2 ADDED, AMPLITUDE IS REDUCED BUT DISTORTION IS SIGNIFICANTLY REDUCED VERSUS 5B

VOLTAGE & CURRENT INPUT
$V = V * \sin(2\pi f)$
$i = I * \sin(2\pi f + \alpha)$

POWER VOLTAGE & CURRENT IN PHASE

POWER FACTOR= 1

$P = \sqrt{3} * V * I * \sin^2(2\pi f)$

VOLTAGE & CURRENT 180° OUT OF PHASE

POWER FACTOR= 1

POWER FACTOR= .5

DC OFFSET

POWER FACTOR= 0
NET DC VALVE= 0

DC OFFSET

POWER MONITORING

This invention relates to power monitoring and more specifically to pump power monitoring.

In order to protect against the risk of catastrophic pump failure and expensive repair costs, a pump can be monitored to detect certain precursors to catastrophic failure such as loss of prime, bearing failure and other conditions. Many pump monitors monitor current. At motor loads of 65% or less, the change in current with change in load is very small; that is, the current curve as a function of load is essentially flat. Therefore, a current monitor is a poor detector for low power problems, such as loss of prime.

Pressure sensors or flow sensors can be mounted in the intake lines to the pump to detect loss of prime. Such sensors, however, can leak, can become jammed or can harbor bacteria, a problem in certain environments, such as chemical or food processing. The present invention satisfies these needs by monitoring the power that is delivered to the pump. Power, unlike current, has a substantially constant slope with respect to the load at both high and low loads. The invention is embodied in the Model PM-50 pump power monitor commercially available from Load Controls Incorporated of Sturbridge, Mass. incorporated by reference herein.

According to the invention, power monitoring apparatus includes a transformer, a Hall cell having a current input for receiving a current signal, a voltage input for receiving a voltage signal from the transformer, and a power output for providing an output power signal representative of the product of the current signal and the voltage signal. A rectifier circuit is coupled to the transformer for providing D.C. power, preferably by an impedance network for reducing distortion, typically comprising first and second resistors in series with respective ends of the secondary winding of the transformer and third and fourth resistors connected between respective ends of the secondary winding and respective terminals of the Hall cell voltage input.

The power monitoring apparatus preferably includes at least one terminal to electrically connect the transformer to a device being powered, typically a pump. Preferably, there is an instrument panel with an indicator for providing a sensible indication of the output power signal, and circuitry coupling the indicator to the Hall cell power output. The indicator may include a meter and at least one warning indicator for providing a sensible indication only when the output power signal is outside predetermined limits. The circuitry may comprise a variable gain device.

There may be trip circuitry that provides a trip signal when the power output signal is outside a predetermined range. There may be a start-up delay circuit which provides an inhibit signal to the trip circuitry for disabling the trip circuitry for a predetermined start-up interval.

The invention may be regarded as apparatus for monitoring power exchanged with electrical apparatus and having at least first and second conductors connected to the electrical apparatus. A multiplier has a current input coupled to at least one of the conductors for receiving a current signal representative of the current carried thereby, a voltage input coupled to the said at least one conductor for receiving a voltage signal representative of the voltage between the first and second conductors and a power output for providing a power signal representative of the product of the current and voltage signal, and trip circuitry for providing a trip signal only when the power signal is outside a predetermined range. The multiplier is typically a Hall device. Typically, there is a transformer and rectifier circuit for supplying D.C. power to the trip circuit with the transformer being coupled to the voltage input and coacting with a rectifier circuit for supplying D.C. power to the trip circuitry. There is preferably absolute value circuitry for providing an absolute value signal representative of the absolute value of the power signal.

A method of power monitoring according to the invention includes multiplying a current signal representative of the current drawn by a device with a voltage signal representative of the voltage across the device and transformer coupled from the device, and rectifying the transformer-coupled voltage to provide D.C. power. Preferably, the voltage that is transformer coupled is also impedance coupled to the multiplier and the rectifier to reduce distortion so that the power output signal is representative of the instantaneous power being drawn by the device. Preferably, the process includes providing a sensible indication of the output power signal, typically only when the output power signal is outside predetermined limits.

Other features, objects and advantages of the invention will become apparent from the following description when read in connection with the accompanying drawings in which.

Figure 1A:
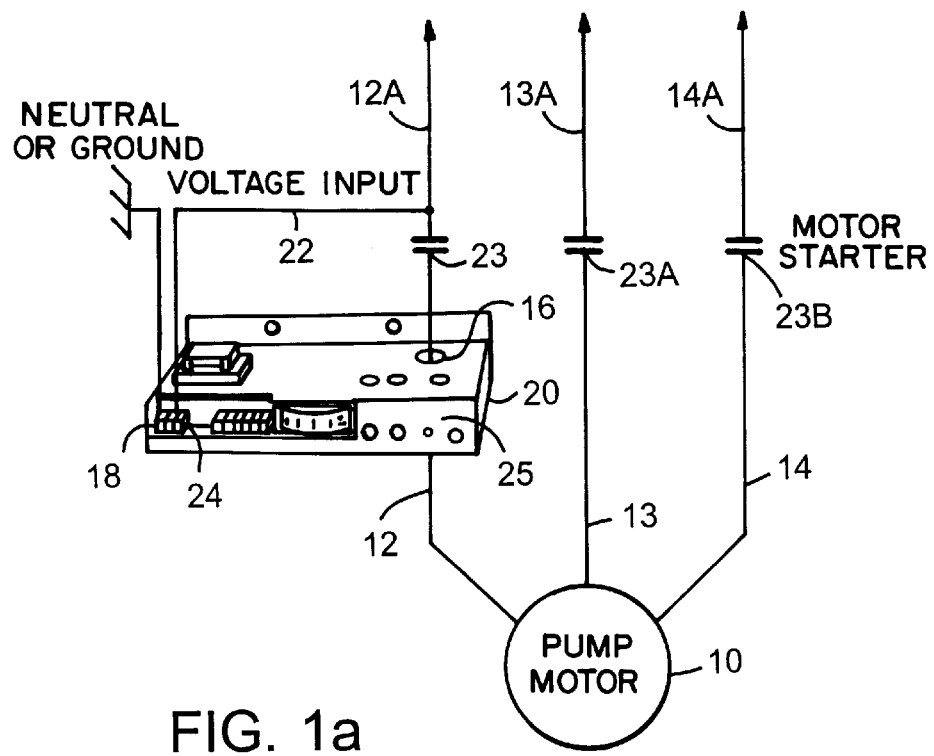
FIGS. 1A and 1B are is a combined pictorial and symbolic diagrams of systems according to the invention.

With reference now to the drawing and more particularly FIG. 1A thereof, there is shown a combined symbolic-pictorial illustration of an embodiment of the invention. Pump motor 10 has three input lines, power line 12, line 13, and line 14 that receive power from lines 12A, 13A and 14A, respectively, connected to an AC power source through motor starter contacts 23, 23A and 23B, respectively. Power line 12 passes through a current-sensing window 16 in pump monitor 20. Neutral or ground is connected to monitor 20 at neutral or ground input terminal 18. A voltage sample input line 22 is connected from line 12A to voltage sample input terminal 24. There may be a number of voltage sample input terminals for accommodating different pump motor voltages and phases. Monitor 20 has an instrument panel 25 that can include switches, indicators, and a meter.

Hole window 16 is a detection window of a Hall cell that senses the magnetic field power line 12. The Hall cell also receives voltage from voltage sample input terminal 24 to provide an output real power signal representative of the product of the current through and voltage on line 12.

Figure 2:
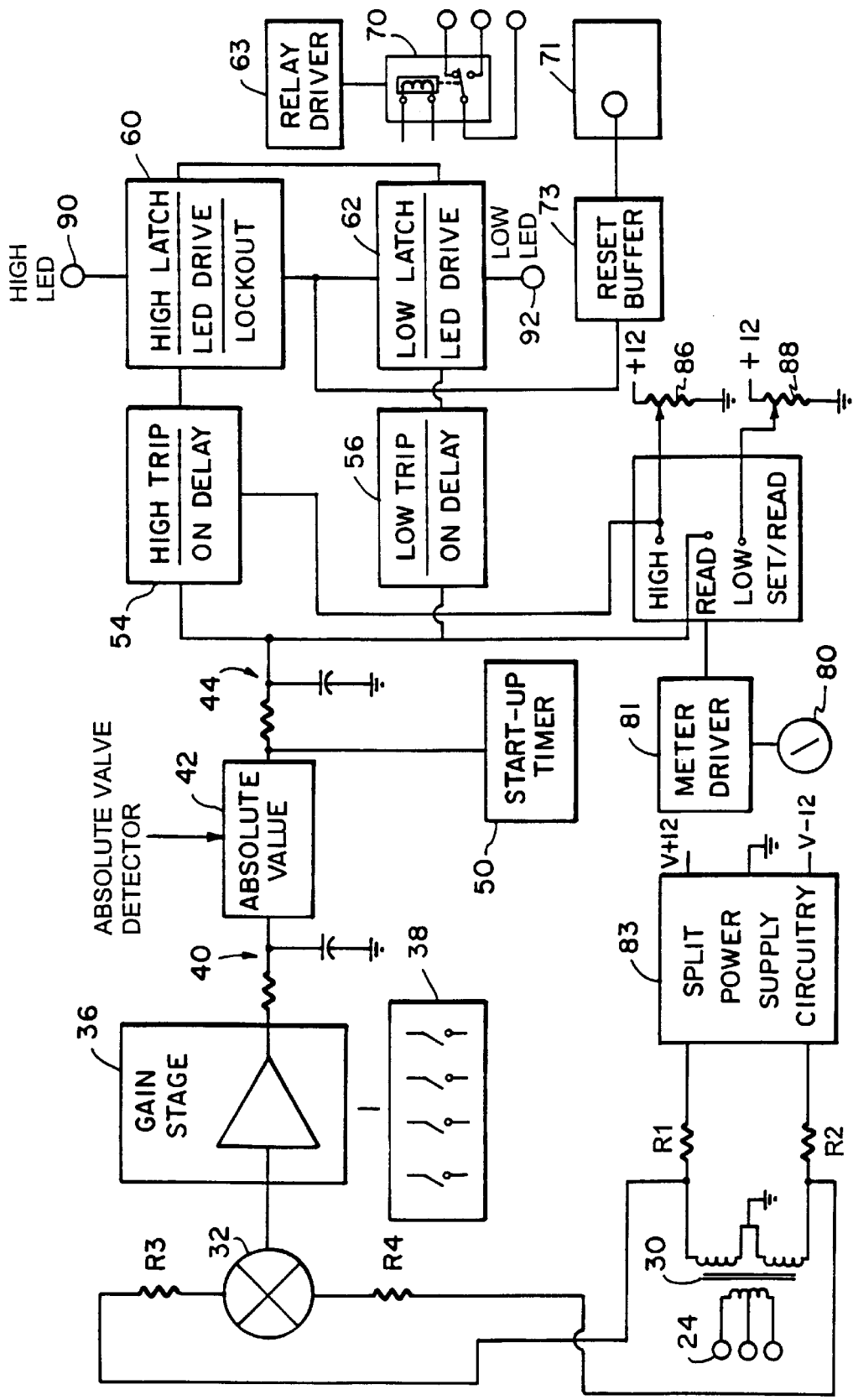
FIG. 2 is a combined block-schematic circuit diagram illustrating the logical arrangement of a system according to the invention.

Referring to FIG. 2, there is shown a block diagram illustrating the logical arrangement of a system according to the invention. Corresponding elements are identified by the same reference symbol throughout the drawings. Voltage sample input terminal 24 is connected to one end of the primary winding of transformer 30. The ends of the secondary winding of transformer 30 are coupled by resistors R3 and R4 across Hall cell 32. The output of Hall cell 32 energizes variable gain stage 36 with gain controlled by switches 38.

Low-pass filter 40 couples the output of gain stage 36 to absolute value detector 42 whose output enables start-up timer 50. Low-pass filter 44 also couples the output of absolute value detector 42 to High Trip On Delay circuit 54 and Low Trip On Delay circuit 56 which provide alarm signals to High Latch LED Drive Lockout 60 and Low Latch LED Drive 62, respectively, after a predetermined delay interval. The output of High Latch LED Drive Lockout 60 and Low Latch LED Drive 62 energize relay driver 63 to operate relay 70 and interrupt the power to pump motor 10.

An external reset switch 71 provides a signal through reset buffer 73 that resets the active one of High Latch LED Drive Lockout 60 and Low Latch LED Drive 62 to provide a signal to relay driver 63 that releases relay 70 and returns power flow to pump motor 10.

A set/read switch 84 couples signals from an activated one of High Trip On Delay 54 and Low Trip On Delay 56 to meter drive 81 to provide an indication on meter 80 of the condition then sensed.

Split power supply circuitry 83 receives energy from the secondary winding of transformer 30 to provide +12 volt and −12 volt D.C. voltages for supplying operating potentials to the circuitry in the monitor.

Figure 3:
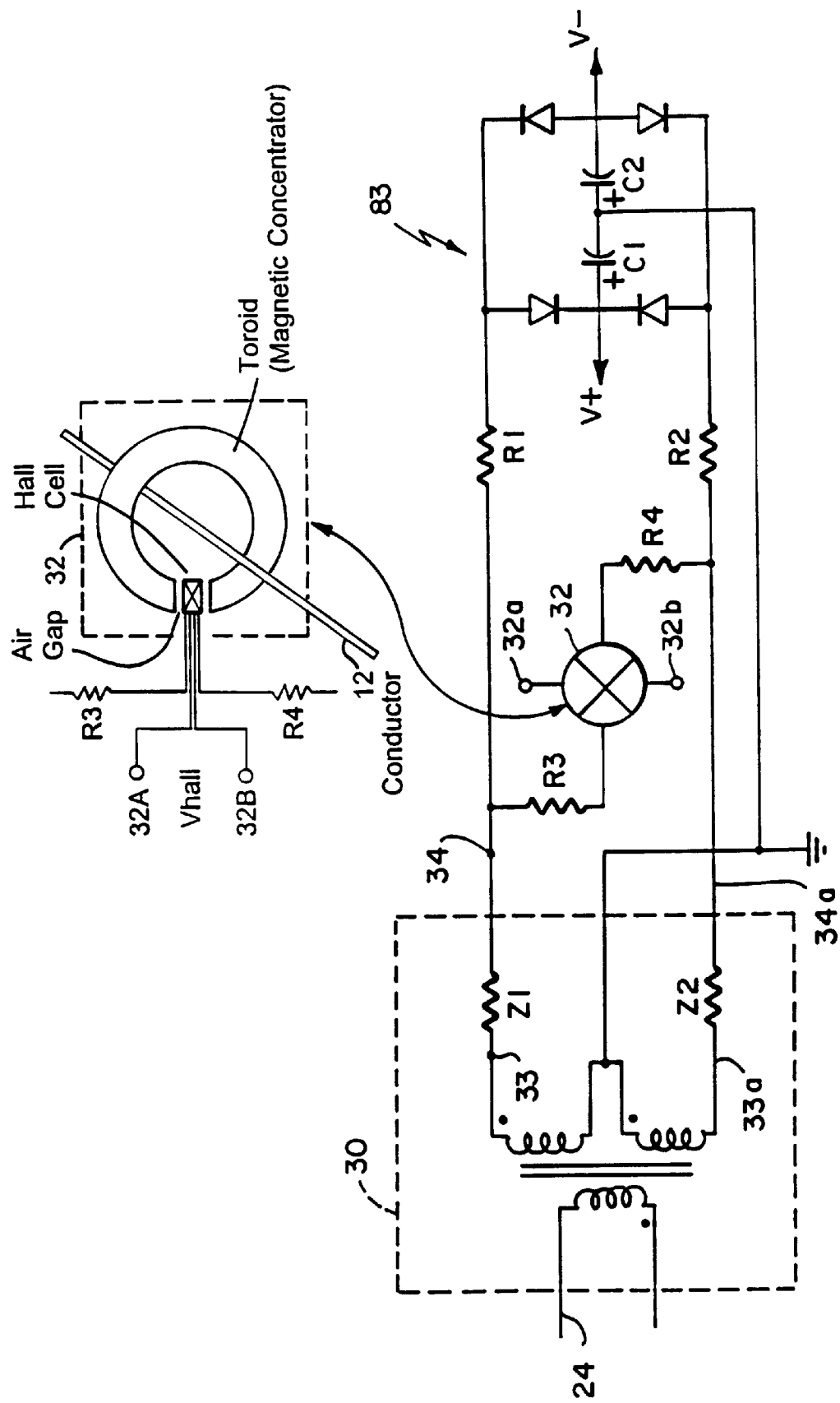
FIG. 3 is a schematic circuit diagram of Hall cell circuitry in an embodiment of the invention.

Referring to FIG. 3, there is shown a schematic circuit diagram of transformer 30, Hall sensor 32 and split power supply circuitry 83. A feature of the invention is that transformer 30 may supply both the voltage to Hall sensor 32 sufficiently free from distortion to allow Hall sensor 32 to provide an output signal accurately representative of the real power drawn by pump 10, and furnish the power for conversion into oppositely polarized D.C. voltages by split power supply circuitry 83.

Ordinarily a low impedance transformer driving a bridge rectifier having large capacitors, C1 and C2, has a voltage across the secondary winding that is a clipped sinusoid as the rectifiers conduct and couple the low impedance of the filter capacitors across the secondary winding. By adding resistors R1 and R2 of sufficiently high value to prevent clipping when the diodes conduct, the voltage waveform across the secondary winding applied through resistors R3 and R4 of Hall sensor 32 remains sinusoidal between terminals 34 and 33 across the secondary winding having winding impedances Z1 and Z2. The Hall cell output voltage across terminals 32A and 32B is then instantaneously proportional to the power drawn by pump motor 10, VI cos θ where V is the input sample voltage on terminal 24, I is the current passing through window 16 in line 12 and θ is the phase angle between this current and the input voltage sample.

Figure 5A:
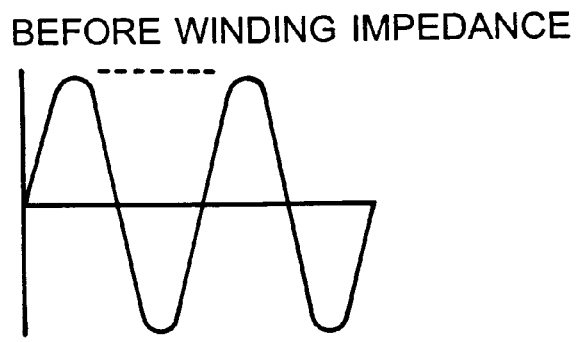
FIGS. 5a–5c show secondary winding waveforms with and without added impedances.
Figure 5B:
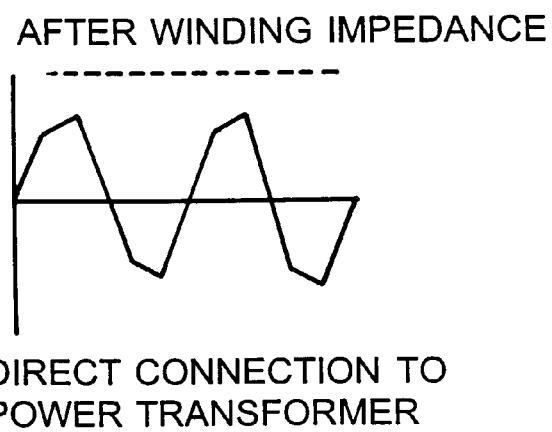
Figure 5C:
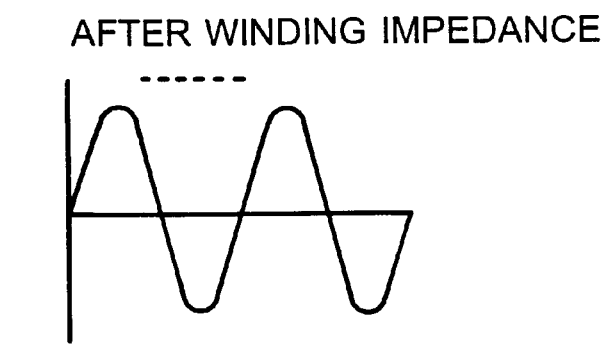

The effect of resistors R1 and R2 is shown in FIGS. 5a–5c. FIG. 5a shows the waveform before winding impedances Z1 and Z2 between nodes 33 and 33a. FIG. 5b shows the waveform after these impedances between nodes 34 and 34a where Hall cell 32 receives its voltage signal without the Hall cell and without resistors R1–R4. FIG. 5c shows the waveform between nodes 34 and 34a with resistors R1 and R2 resulting in significantly less distortion.

Figure 4:
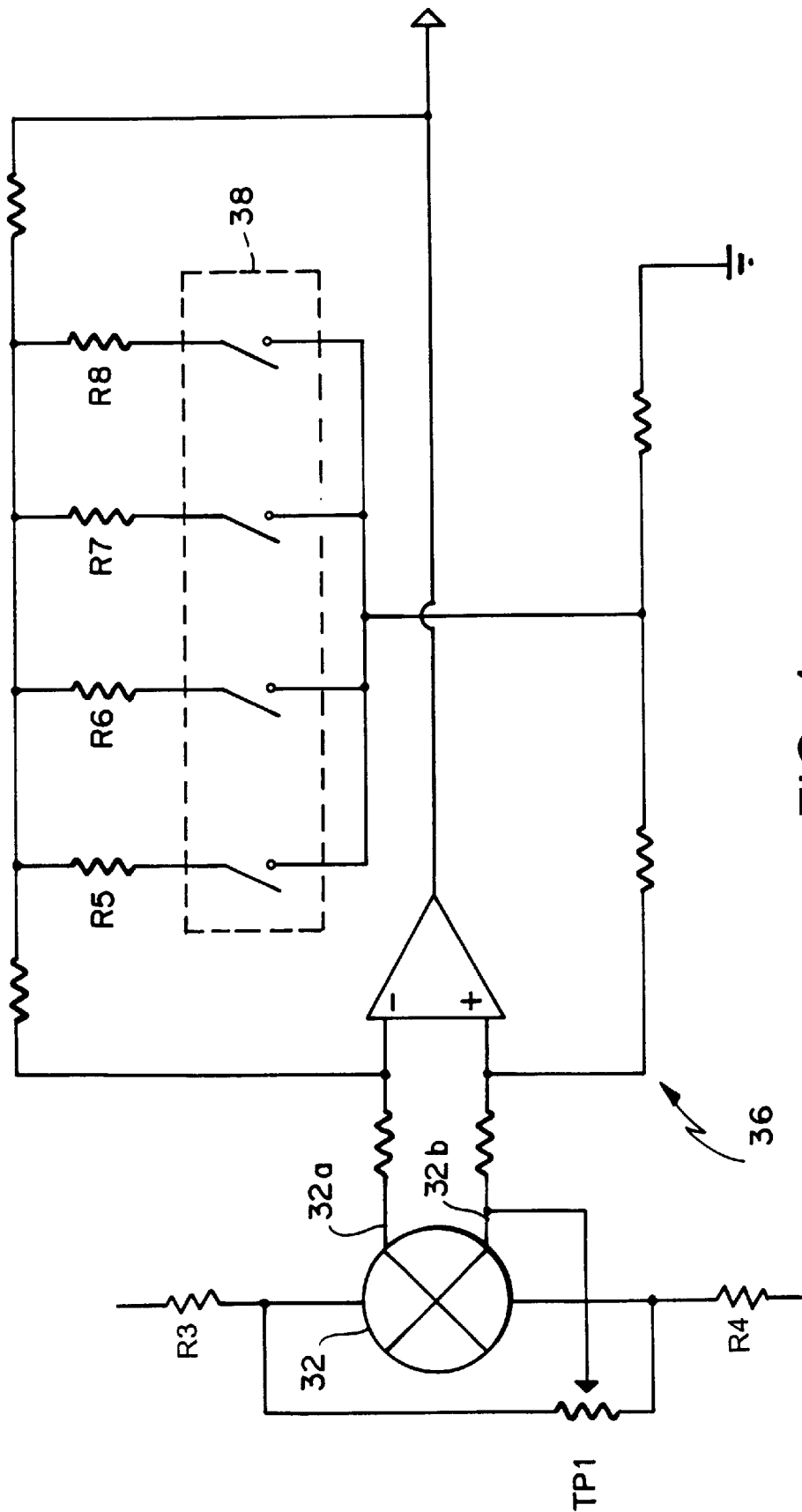
FIG. 4 is a schematic circuit diagram of a variable gain amplifier stage.

An exemplary gain stage is shown in FIG. 4. Gain stage 36 comprises a balanced input operational amplifier with gain determined by switching one or more resistor(s), R5–R8, in the feedback network. The switching allows a wide range of gain and typically accommodates a current range of 10:1, e.g. 10 amps to 100 amps. Pot TP1 is added for trimming due to offsets inherent in Hall cell 32.

Figure 1B:
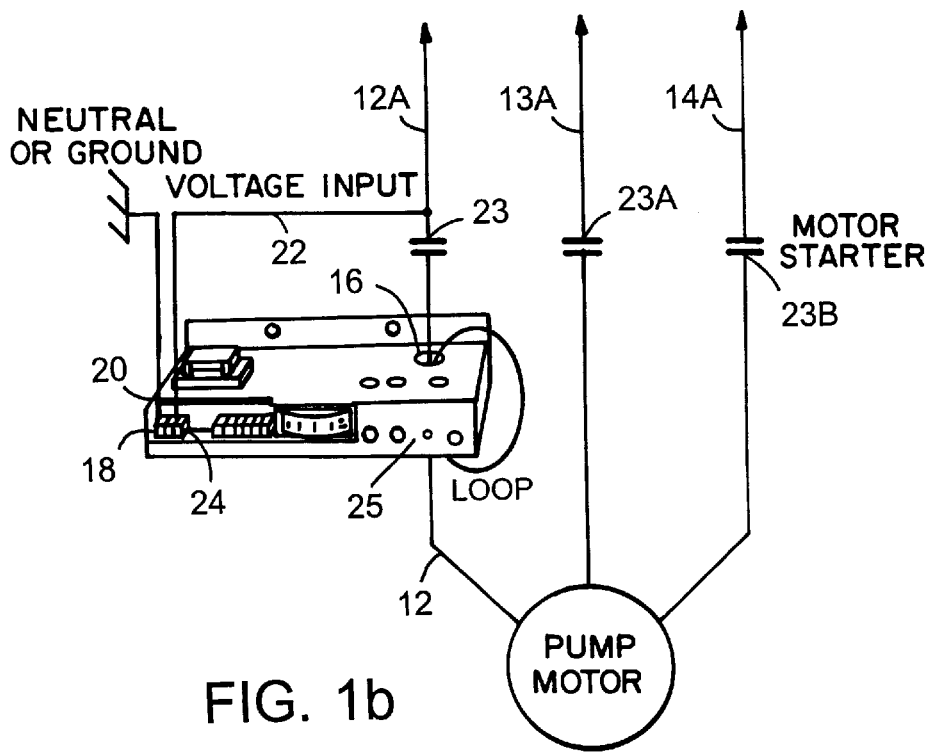

Alternatively, the power sensed by the monitor can be reduced by mechanically looping line 12 around the monitor housing and through the window 16 a second time or even higher number of times (FIG. 1B). This looping can also be combined with the gain switches to obtain a desired capacity or sensitivity.

Figure 6A:
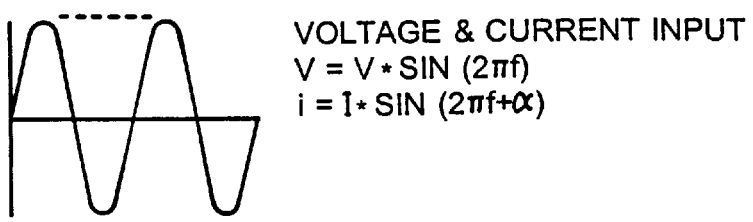
FIGS. 6a–6e are graphical representations of certain signal waveforms helpful in understanding the principles of operation.
Figure 6B:
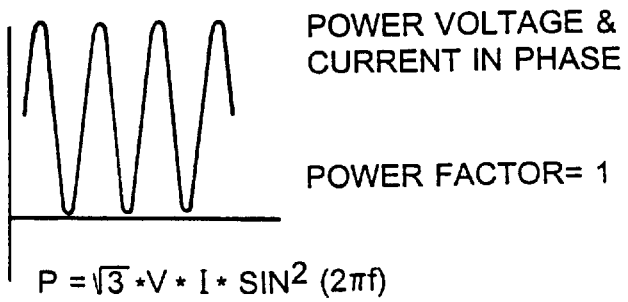
Figure 6C:
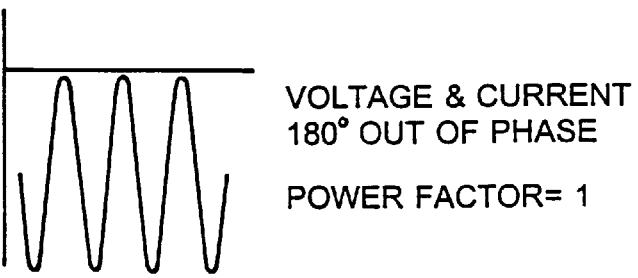

Referring to FIGS. 6a–6e, there are shown graphical representations of signal waveforms helpful in understanding principles of operation. FIG. 6a shows the general shape of the voltage and current where v=V* sin (2πf) and i=I* sin (2πf+a), where cos (a) is the power factor, pf. The product, power, is √3*V*I* sin (2πf) sin (2πf+a) for a three-phase circuit. FIG. 6b shows the power $\sin^2$ waveform above the baseline when pf=1 and voltage and current are in phase. FIG. 6c shows the power $\sin^2$ waveform below the baseline when pf=1 and voltage and current are 180° out of phase. These waveforms are at the output of gain stage 36 and have envelopes characterized by an average D.C. value.

Figure 6D:
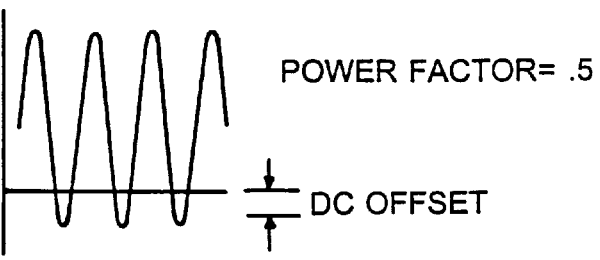
Figure 6E:
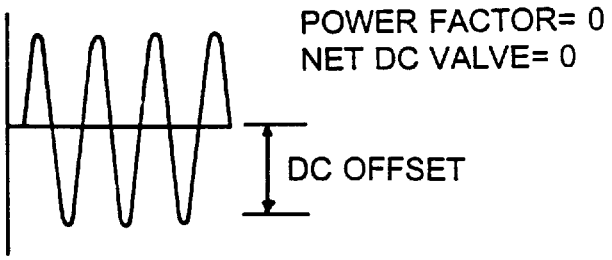

Assuming a positive envelope, as the power factor leads or lags, the envelope shifts in average D.C. value in the negative direction as shown in FIG. 6d where pf=0.5. At pf=0 in FIG. 6e, the net D.C. value equals zero.

The output from gain stage 36 is coupled by low-pass filter 40 to absolute value stage 42 independent of current direction through or voltage polarity across Hall cell 32 to provide an output of a positive polarity. Gain trim for Hall cell sensitivity differences may also be effected in absolute value stage 42.

Load start-up timer 50 (FIG. 2) provides an inhibiting signal that disables the Hi Trip On Delay and Low Trip On Delay circuits when the motor is off and for a predetermined time after the motor starts, typically 12 seconds. Otherwise, a false low trip would be generated just after the motor starts, and a false high trip would occur on start-up from in-rush currents. Start-up time is preferably long enough to bypass in-rush currents and allow the pump to begin moving fluid.

High trip circuitry 54 and low trip circuitry 56 are well known and represented in block form. If the output from absolute value stage 42 and RC filter 44 is higher or lower than certain preset trip values, a trip signal occurs after a predetermined time interval. These trip values may be set in a manner discussed below. Both trip circuits 54 and 56 have built in delays, referred to as On Delay, which delay providing a trip signal for a predetermined time to output high and low latches 60 and 62. In one embodiment, these delays are typically 0.5 seconds for high trip and 5 seconds for low trip. On Delay prevents momentary overloads or underloads from causing unnecessary nuisance trips. When a trip does occur, circuitry at High Latch 60 or Low Latch 62 causes illumination of a corresponding LED, 90 or 92 respectively, on instrument panel 25 (FIG. 7) to notify an operator that a trip has occurred.

A feature of the invention resides in minimizing circuit loading changes to minimize fluctuations in the voltage applied to Hall cell 32 while using the relatively inexpensive unregulated split power supply. By maintaining the current drawn from split power supply circuitry 83, the voltage on Hall cell 32 does not fluctuate appreciably. However, power line changes are reflected accurately to the Hall cell for the power calculation.

The greatest current draw changes occur when changing the state of a relay and indicator LED. By maintaining the coil of relay 70 normally energized and the LED's normally extinguished, occurrence of a trip de-energizes the coil relay and energized an LED so that changes in state of these devices is accompanied by steering current from one to the other to effectively provide a net current change of substantially zero drawn from power supply circuitry 83 by selecting the current drawn by relay coil 70 to be substantially the same as that drawn by the illuminated LED.

Another feature of the invention resides in interlocking High Latch LED Drive Lockout 60 and Low Latch LED Drive 62.

If there is a high trip, relay 70 changes state to de-energize pump 10. The internal power signal will then decay. Before this signal decays to the point where start-up timer 50 inhibits a low trip point, however, this signal must pass through the low set point as the motor shuts off. It would be possible for both the high and low indicator LED's, 90 and 92, to be lit, in which case an operator would not know for sure whether a high power or low power problem had occurred. By interconnecting the latches so that High Latch 60 locks out Low Latch 62, the latter cannot cause illumination of the LED 92 when a high trip occurs. There is no need for Low Latch 62 to lock out High Latch 60 because interrupting pump motor power upon occurrence of a low trip does not cause the occurrence of a high trip condition.

The monitor is adjusted in the manner set forth below describing normal set-up so that the monitor performs a handling routine including interrupting power to the motor if the power value falls outside the range of permissible power values typically corresponding to the range of power values between high trip and low trip.

Figure 7:
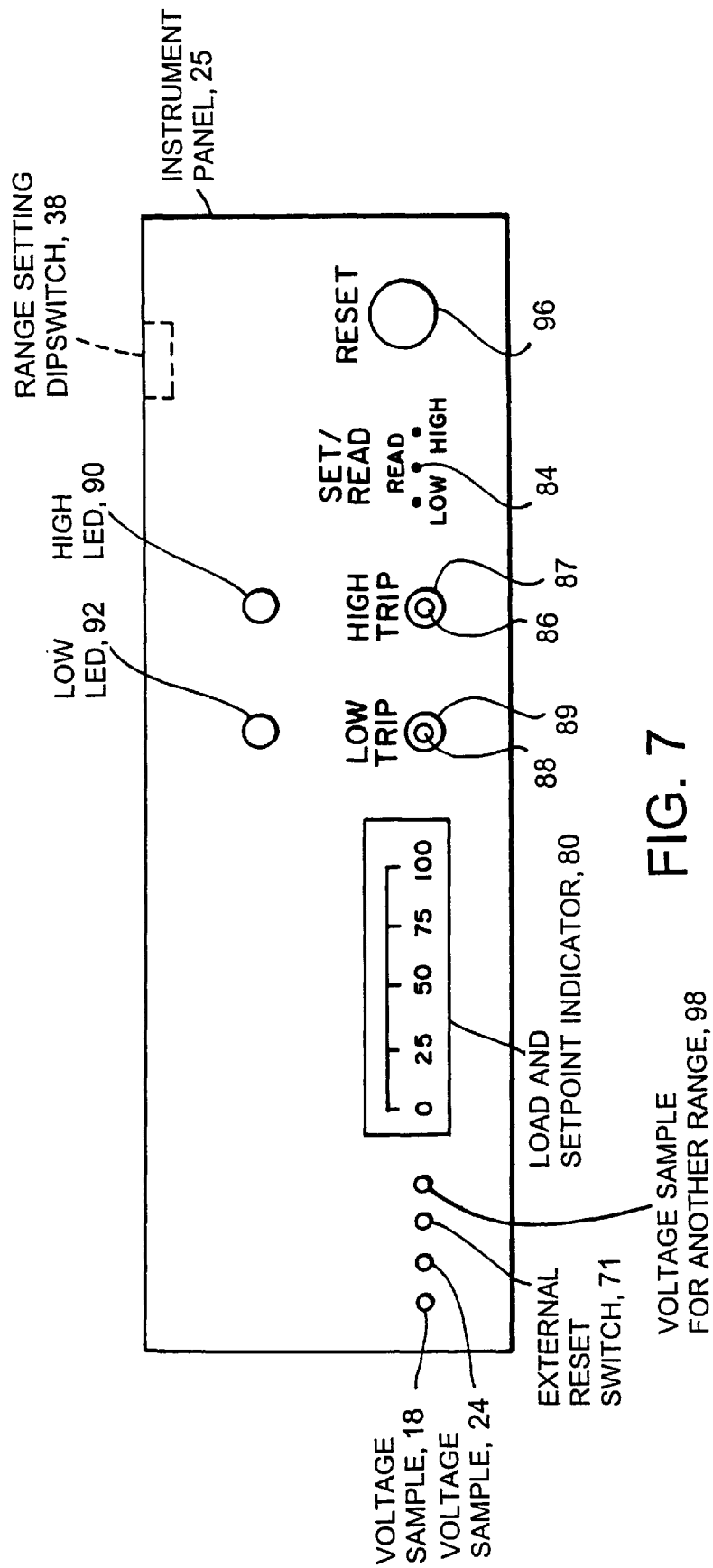
FIG. 7 is a diagrammatic representation of the instrument panel of an exemplary embodiment.

Another feature of the invention is the ease with which set-up may be effected. Referring to FIG. 7 there is shown instrument panel 25 with indicators and controls. Panel 25 includes meter 80, which may be a self-contained analog or digital meter that displays motor power when set/read switch 84 is in the read position. Set/read switch 84 taps off the wipers of high set point adjusting potentiometer 86 and low set point adjusting potentiometer 88 to allow the set points to be displayed on meter 80.

Normal set-up is as follows:
1) Run pump motor 10 and set the gain dip switches 38 for an approximate indication of 50 percent of full scale on meter 80.
2) Run pump motor 10 at full flow and observe the reading on meter 80. Switch set/read switch 84 to HIGH and adjust high trip potentiometer 86 for a meter reading just above the observed value.
3) Run pump motor 10 at minimum flow and observe the reading on meter 80. Switch said set/read switch 84 to LOW and adjust low trip potentiometer 88 so that meter 80 displays a low trip value just below the observed value for minimum flow. Set-up time according to the invention is substantially reduced over other methods.

Potentiometers 86 and 88 may include lock nuts 87 and 89, respectively, to lock these potentiometers after being set.

LED indicators 90 and 92 are illuminated by High Latch LED Drive Lockout circuit 60 and Low Latch LED Drive 62, respectively.

After relay 70 is tripped, a reset signal may be provided to reset buffer 73 by actuating local push button 96 or a remote external reset 71 providing a signal on terminal 98. The reset input is preferably diode isolated to allow multiple monitors to be wired in parallel and allow reset from one remote button or programmable controller contact.

The invention may be used with a wide variety of pump motors. For example, there may be a second reference voltage input terminal 25 that may be used for 220–240 volt single-phase or 385–480 volt three-phase pumps.

Figure 8A:
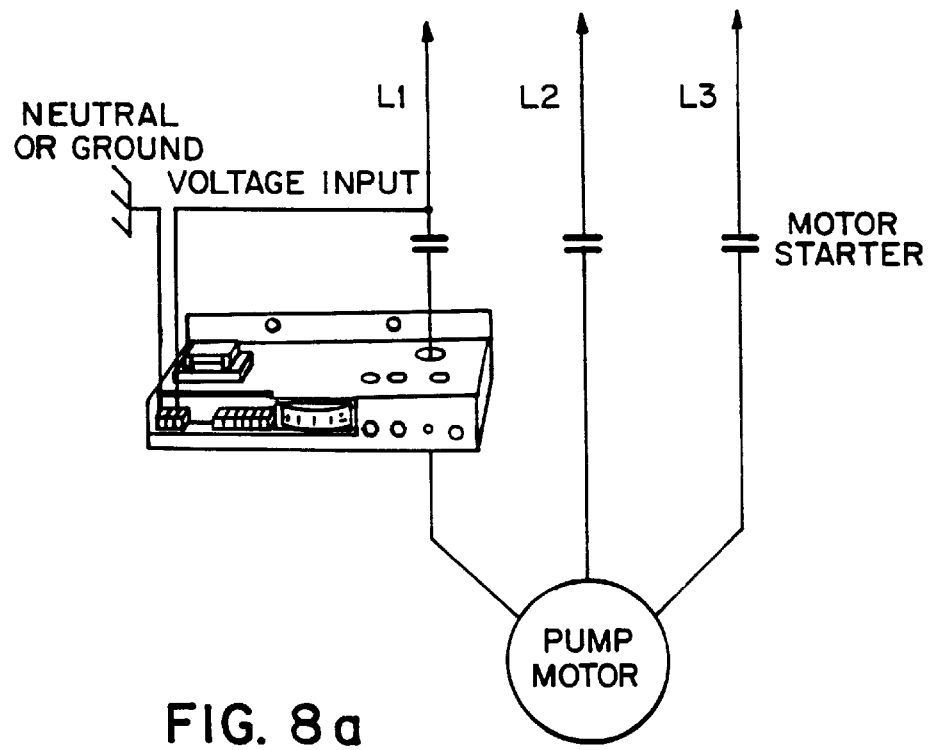
FIGS. 8a, 8b and 8c show suitable wiring arrangements for incorporating the monitor in 3-wire, 4-wire and grounded delta, respectively, 3-phase circuits.
Figure 8B:
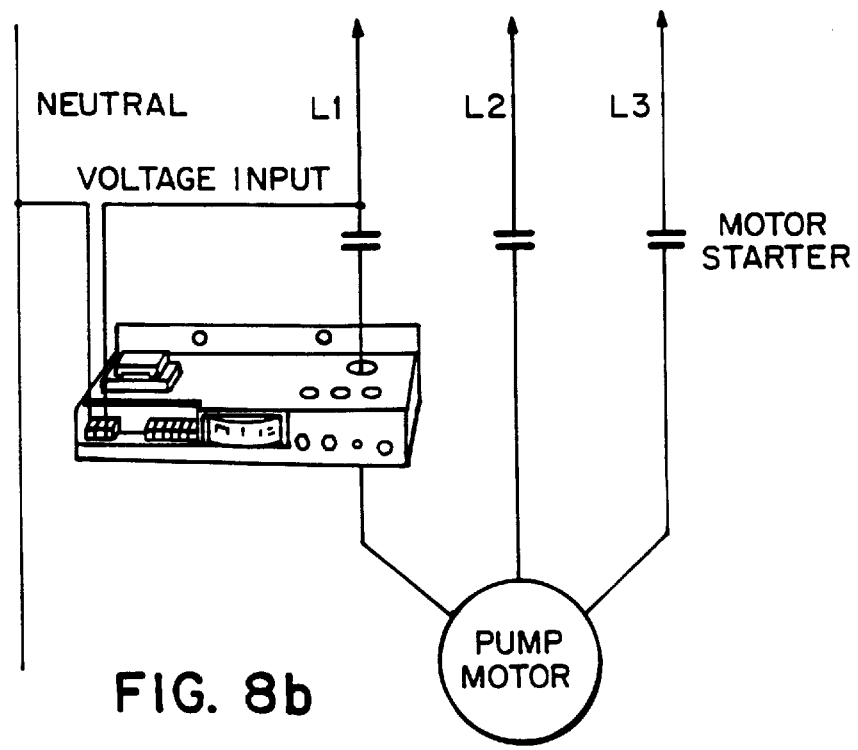
Figure 8C:
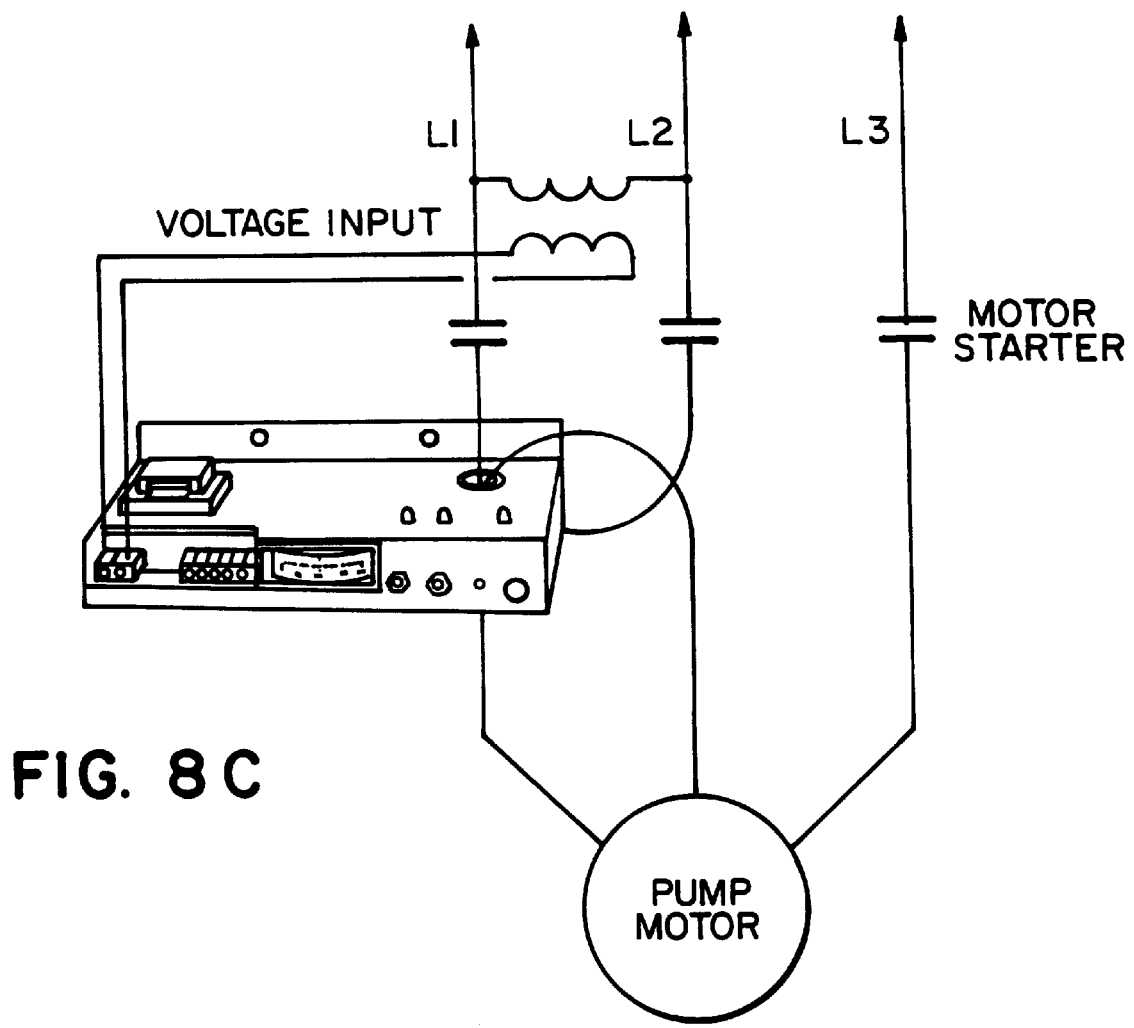

Referring to FIGS. 8*a*, 8*b* and 8*c*, there are shown wiring diagrams for three-phase-three wire, three-phase-four wire and grounded delta systems, respectively.

FIG. 8A shows a typical connection for WYE style power distribution systems. Line L1 passes through the window, and a voltage sample is taken from phase to ground. This arrangement provides the proper phase relationship for multiplication. Note that the sense of the conductor through the window or sense of connection to the terminal block are not important.

FIG. 8B shows connections for ground WYE power distribution. The explanation in the preceding paragraph applies to the system of FIG. 8B.

FIG. 8C shows a connection that may be used anytime, but is particularly useful for delta power sources. In a delta configuration, there is no reference to a ground or neutral. Phase voltage to ground is capacitively determined. Consequently, the voltage can be quite erratic and present a large error to the transducer. FIG. 8C shows a line-to-line transformer powering the device. Because transformers subtract, this arrangement shifts the apparent phase of the line. Passing line L1 through the window in one direction, and line L2 in the opposite direction causes subtraction of the currents by virtue of their magnetic fields subtracting. The net effect is to re-establish the proper phase relationship with the voltage. Note the added benefit of reduced cost since both wires pass through the same window. Once again, sensitivity may be increased by having multiple turns of each wire.

While the invention is especially advantageous in connection with monitoring pump motor power, the invention is useful for monitoring power drawn by other electric motors, and monitoring electrical and other power in general.

Other embodiments are within the claims.

What is claimed is:

1. Monitoring apparatus for monitoring power exchanged with electrical apparatus comprising:

at least first and second conductors connected to said electrical apparatus, a multiplier having a current input coupled to at least one of said conductors for receiving a current signal representative of the current carried thereby, a voltage input coupled to said at least one conductor for receiving a voltage signal representative of the voltage between said first and second conductors and a power output for providing a power signal representative of the product of said current and voltage signal, and trip circuitry coupled to said power output for providing a trip signal only when said power signal is outside a predetermined range, and further including absolute value circuitry for providing an absolute value signal representative of the absolute value of said power signal.

2. The monitoring apparatus of claim 1 wherein said multiplier is a Hall device.

3. The monitoring apparatus of claim 2 and further comprising a transformer intercoupling said multiplier and said electrical apparatus and rectifier circuitry for supplying D.C. power to said trip circuitry, said transformer coupled to said voltage input and said rectifier circuitry.

4. The monitoring apparatus of claim 1 wherein said absolute value circuitry includes a low pass filter coupling the output of said multiplier to an absolute value detector.

5. Power monitoring apparatus comprising:

a transformer;

a Hall cell having a current input for receiving a current signal, a voltage input for receiving a voltage signal from said transformer, and a power output for providing an output power signal representative of the product of said current signal and said voltage signal; and a rectifier circuit coupled to said transformer for providing D.C. power, and further comprising a distortion-reducing impedance network intercoupling said transformer, said voltage input and said rectifier circuit.

6. Power monitoring apparatus in accordance with claim 5 wherein said transformer has a secondary winding with first and second ends and said distortion-reducing impedance network comprises first and second resistors connected between said first and second ends respectively and said voltage input and third and fourth resistors connected between said first and second ends respectively and said rectifier circuit.

7. The power monitoring apparatus of claim 5 wherein said power monitoring apparatus includes at least one terminal to electrically connect said transformer to a device being powered.

8. The power monitoring apparatus of claim 7 wherein said device is a pump.

9. The power monitoring apparatus of claim 7 and further comprising an instrument panel with an indicator for providing a sensible indication of said output power signal, and circuitry coupling said indicator to said power output.

10. The power monitoring apparatus of claim 9 wherein said indicator includes a meter and at least one warning indicator for providing a sensible indication only when said output power signal is outside predetermined limits.

11. The power monitoring apparatus of claim 9 wherein said circuitry comprises a variable gain amplifier.

12. The power monitoring apparatus of claim 11 wherein said variable gain amplifier comprises a single adjustable resistance for establishing the gain of said variable gain amplifier.

13. The power monitoring apparatus of claim 12 wherein said single adjustable resistance comprises a plurality of switchable resistors in parallel.

14. The power monitoring apparatus of claim 5 and further comprising, trip circuitry coupled to said power output for providing a trip signal when said power output signal is outside a predetermined range.

15. The power monitoring apparatus of claim 14 and further comprising a start-up delay circuit which provides an inhibit signal to said trip circuitry for disabling said trip circuitry for a predetermined start-up interval.

16. The power monitoring apparatus of claim 15 and further comprising, a source of a high trip signal that occurs when said power output signal is above said predetermined range, a source of a low trip signal that occurs when said power output signal is below said predetermined range, a high trip delay circuit which provides a high inhibit signal to said trip circuitry for disabling said trip circuitry for a predetermined high delay interval, a low trip delay circuit which provides a low inhibit signal to said trip circuitry for disabling said trip circuitry for a predetermined low delay interval, and an output latch circuit constructed and arranged to inhibit the occurrence of a low trip signal when said high trip signal occurs first.

* * * * *